(12) United States Patent
Suzuki et al.

(10) Patent No.: US 9,064,169 B2
(45) Date of Patent: Jun. 23, 2015

(54) INFORMATION MANAGEMENT APPARATUS AND NON-TRANSITORY COMPUTER-READABLE MEDIUM

(71) Applicants: Yuichiro Suzuki, Komaki (JP);
Toshitaka Iwago, Nagoya (JP);
Takehiko Inaba, Chita-gun (JP)

(72) Inventors: Yuichiro Suzuki, Komaki (JP);
Toshitaka Iwago, Nagoya (JP);
Takehiko Inaba, Chita-gun (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 21 days.

(21) Appl. No.: 14/062,964

(22) Filed: Oct. 25, 2013

(65) Prior Publication Data
US 2014/0119658 A1 May 1, 2014

(30) Foreign Application Priority Data
Oct. 26, 2012 (JP) ................................. 2012-237260

(51) Int. Cl.
| | |
|---|---|
| G06K 9/00 | (2006.01) |
| G06K 9/18 | (2006.01) |
| G06K 9/22 | (2006.01) |
| G06F 3/0354 | (2013.01) |
| G06K 9/20 | (2006.01) |
| G06F 3/041 | (2006.01) |

(52) U.S. Cl.
CPC ........ *G06K 9/18* (2013.01); *G06F 3/041* (2013.01); *G06K 9/222* (2013.01); *G06F 3/03545* (2013.01); *G06K 9/2054* (2013.01)

(58) Field of Classification Search
CPC .................... G06K 9/00; G06F 3/00
USPC .................. 382/179, 187; 345/173, 179
See application file for complete search history.

(56) References Cited

U.S. PATENT DOCUMENTS

| | | | | |
|---|---|---|---|---|
| 6,052,481 A | * | 4/2000 | Grajski et al. | ............... 382/187 |
| 6,144,764 A | * | 11/2000 | Yamakawa et al. | ........... 382/187 |
| 2002/0163511 A1 | | 11/2002 | Sekendur | |

(Continued)

FOREIGN PATENT DOCUMENTS

| | | |
|---|---|---|
| JP | 62-179075 A | 8/1987 |
| JP | 63-115266 A | 5/1988 |

(Continued)

OTHER PUBLICATIONS

Co Pending U.S. Appl. No. 14/062,944, filed Oct. 25, 2013.

(Continued)

*Primary Examiner* — Abolfazl Tabatabai
(74) *Attorney, Agent, or Firm* — Banner & Witcoff, Ltd.

(57) ABSTRACT

An information management apparatus includes a processor and a memory. The memory is configured to store computer-readable instructions that, when executed, cause the processor to perform processes including acquiring stroke data, the stroke data being data representing a trajectory and being data that includes information indicating positions on the trajectory, identifying, based on first stroke data, a first character string that is a character string formed by a first trajectory, identifying, based on second stroke data, a second character string that is a character string formed by a second trajectory, generating an image file that is a data file representing a third trajectory based on third stroke data, storing the image file in storing portion as a file including at least the first character string in a file name, and storing the image file in the storing portion in association with data representing the second character string.

8 Claims, 11 Drawing Sheets

(56) References Cited

U.S. PATENT DOCUMENTS

2003/0106985 A1    6/2003    Fagin et al.
2008/0065396 A1    3/2008    Marshall
2008/0181501 A1    7/2008    Faraboschi et al.

FOREIGN PATENT DOCUMENTS

| JP | 01-118955 A   | 5/1989  |
| JP | 04-048375 A   | 2/1992  |
| JP | 11-203409 A   | 7/1999  |
| JP | 2000-315241 A | 11/2000 |
| JP | 2002-132792 A | 5/2002  |
| JP | 2003-323441 A | 11/2003 |
| JP | 2009-098836 A | 5/2009  |
| JP | 2010-205138 A | 9/2010  |

OTHER PUBLICATIONS

Co Pending U.S. Appl. No. 14/063,089, filed Oct. 25, 2013.
Co Pending U.S. Appl. No. 14/063,122, filed Oct. 25, 2013.
Apr. 17, 2015—(US) Non-Final Office Action—U.S. Appl. No. 14/063,089.

* cited by examiner

FIG. 4

| No | IMAGE FILE | | | |
|---|---|---|---|---|
| | FILE NAME | LOCATION | TAG | |
| 1 | CONTENT FOR EXCHANGE BETWEEN MEMBERS | C:¥TRAY | NEXT TIME | |
| 2 | CONTENT WRITTEN ON NOTE | C:¥TRAY | IN PROGRESS | |
| 3 | CONTENT RELATING TO SIGHTSEEING | C:¥TRAY | REFERENCE MATERIALS | |
| 4 | LABEL COPY | C:¥TRAY | WANT TO SEE NOW | |
| 5 | 2011/10/26 20 : 50 | C:¥TRAY | APPLICATION | |
| : | : | : | : | |

421

INFORMATION MANAGEMENT APPARATUS AND NON-TRANSITORY COMPUTER-READABLE MEDIUM

CROSS-REFERENCE TO RELATED APPLICATION

This application claims priority to Japanese Patent Application No. 2012-237260, filed Oct. 26, 2012, the content of which is hereby incorporated herein by reference in its entirety.

BACKGROUND

The present disclosure relates to an information management apparatus that manages hand-written information which is read by a reading device and to a non-transitory computer-readable medium.

Technology is known that manages hand-written input line image data. For example, an electronic chart system is known in which a user can hand-write and thereby input a line image in a free format into an image area via a touch screen. The user inputs a character string into a text area via a keyboard. The electronic chart system associates a hand-written input line image with the character string input via the keyboard. When searching for the hand-written input line image, the user can use the character string input via the keyboard as a keyword for the search.

SUMMARY

In the above-described electronic chart system, the input methods for the line image and the character string are different. Therefore, when the user inputs the line image and the character string, it is necessary to switch the input method and there is a case in which an operation is troublesome and inefficient.

Various embodiments of the broad principles derived herein provide an information management apparatus that is able to manage a line image that is input efficiently by an easy operation by a user and also to manage information to search for the line image, and a non-transitory computer-readable medium.

Various embodiments provide the information management apparatus that includes a processor and a memory. The memory is configured to store computer-readable instructions that, when executed, cause the processor to perform processes including acquiring stroke data, the stroke data being data representing a trajectory detected by detecting portion and being data that includes information indicating a plurality of positions on the trajectory, and the detecting portion being configured to detect the trajectory of writing portion that moves within a predetermined area, identifying, based on first stroke data, a first character string that is a character string formed by a first trajectory, the first stroke data being data representing the first trajectory among a plurality of the trajectories represented by the stroke data, and the first trajectory being a trajectory within a first area that is a specific area within the predetermined area, identifying, based on second stroke data, a second character string that is a character string formed by a second trajectory, the second stroke data being data representing the second trajectory among the plurality of trajectories represented by the stroke data, and the second trajectory being a trajectory within a second area that is a specific area within the predetermined area and that is an area other than the first area, generating an image file that is a data file representing, by an image, a third trajectory based on third stroke data, the third stroke data being data representing the third trajectory among the plurality of trajectories represented by the stroke data, and the third trajectory being a trajectory within a third area that is a specific area within the predetermined area and that is an area other than the first area and the second area, storing the image file in storing portion as a file including at least the first character string in a file name, and storing the image file in the storing portion in association with data representing the second character string.

Embodiments also provide a non-transitory computer-readable medium storing computer readable instructions that, when executed, cause an information management apparatus to perform processes including acquiring stroke data, the stroke data being data representing a trajectory detected by detecting portion and being data that includes information indicating a plurality of positions on the trajectory, and the detecting portion being configured to detect the trajectory of writing portion that moves within a predetermined area, identifying, based on first stroke data, a first character string that is a character string formed by a first trajectory, the first stroke data being data representing the first trajectory among a plurality of the trajectories represented by the stroke data, and the first trajectory being a trajectory within a first area that is a specific area within the predetermined area, identifying, based on second stroke data, a second character string that is a character string formed by a second trajectory, the second stroke data being data representing the second trajectory among the plurality of trajectories represented by the stroke data, and the second trajectory being a trajectory within a second area that is a specific area within the predetermined area and that is an area other than the first area, generating an image file that is a data file representing, by an image, a third trajectory based on third stroke data, the third stroke data being data representing the third trajectory among the plurality of trajectories represented by the stroke data, and the third trajectory being a trajectory within a third area that is a specific area within the predetermined area and that is an area other than the first area and the second area, storing the image file in storing portion as a file including at least the first character string in a file name, and storing the image file in the storing portion in association with data representing the second character string.

BRIEF DESCRIPTION OF THE DRAWINGS

Embodiments will be described below in detail with reference to the accompanying drawings in which:

FIG. 4 is diagram showing a table;

DETAILED DESCRIPTION

Figure 1:
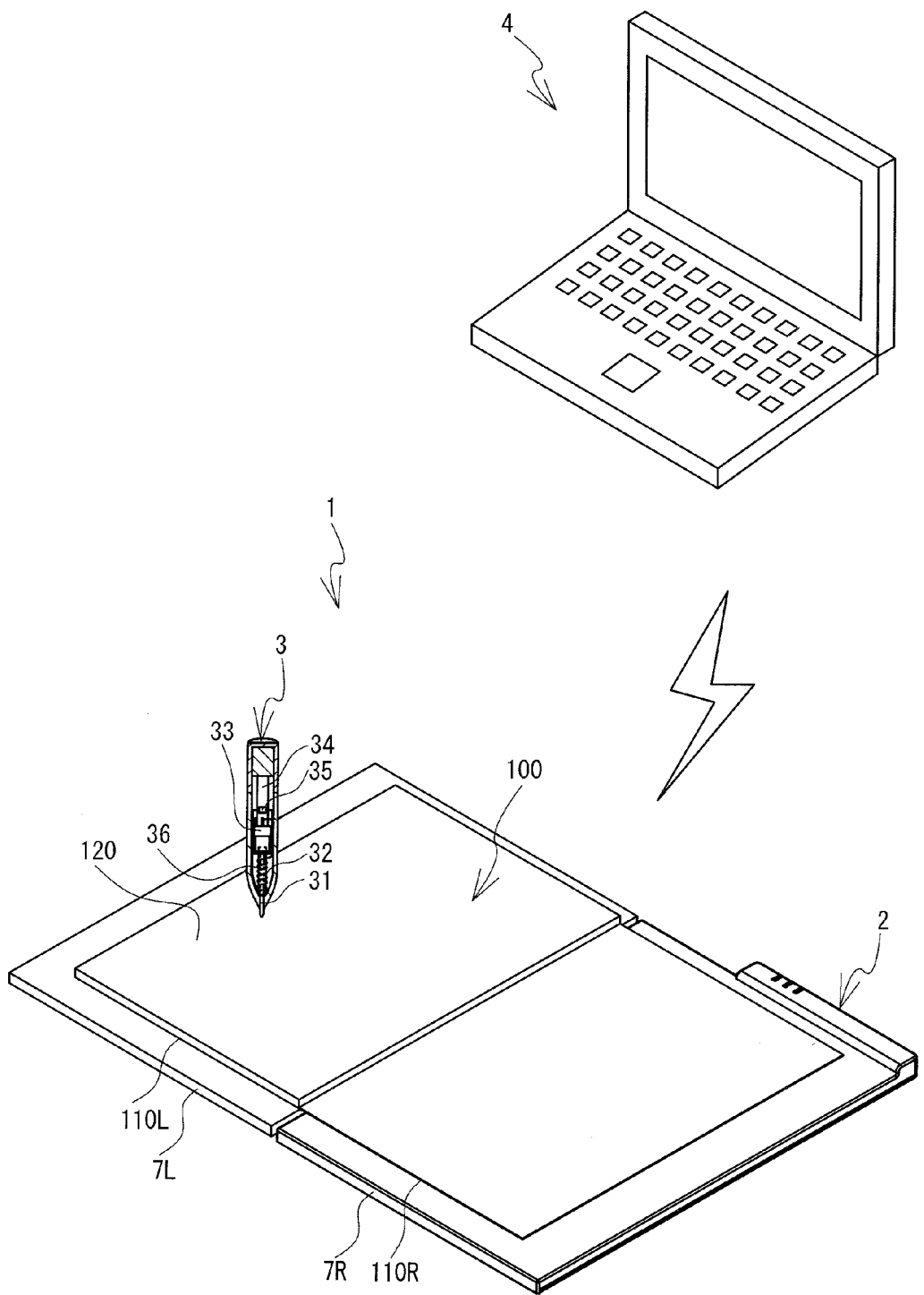
FIG. 1 is a diagram showing an overview of a handwriting input system.

Hereinafter, an embodiment of the present disclosure will be explained with reference to the drawings. The drawings referred to are used to explain technological features that can be adopted by the present disclosure. Configurations of devices noted in the drawings, and flowcharts of various processing etc. are not limited only to the examples given and are simply explanatory examples.

An overview of a handwriting input system 1 according to the present embodiment will be explained with reference to FIG. 1. In the following explanation, an upper left side, a lower right side, an upper side, a lower side, an upper right side and a lower left side in FIG. 1 are, respectively, a left side, a right side, an upper side, a lower side, a rear side and a front side of a reading device 2.

The handwriting input system 1 includes the reading device 2, an electronic pen 3 and a personal computer (hereinafter, referred to as a PC) 4. In the handwriting input system 1, a user can use the electronic pen 3 to write a line image (a character, a numeral, a symbol or a graphic etc.) on a paper sheet 120 of a paper medium 100 that is fixed to the reading device 2. The reading device 2 is configured to detect a trajectory of the electronic pen 3 and acquire stroke data that will be explained later. Based on the stroke data acquired by the reading device 2, the PC 4 generates a digitized image file of the line image input onto the paper sheet 120 and manages the image file.

A main body of the reading device 2 is formed of a pair of left and right sensor boards 7L and 7R. The sensor boards 7L and 7R have the same rectangular thin plate-shape, and are arranged such that the sensor boards 7L and 7R can be opened out to a two-page spread in the left-right direction. Each of the sensor boards 7L and 7R includes a large number of long thin loop coils that are arranged in both an X axis direction and in a Y axis direction. The reading device 2 is a thin light-weight handwriting input device that is portable when the sensor boards 7L and 7R are in a folded over state.

The electronic pen 3 is a known electromagnetic induction-type electronic pen. The electronic pen 3 includes a core body 31, a coil 32, a variable capacity condenser 33, a board 34, a condenser 35 and an ink storage portion 36. The core body 31 is provided on the leading end portion of the electronic pen 3. The core body 31 is urged toward the leading end of the electronic pen 3 by an elastic member that is not shown in the drawings. The leading end portion of the core body 31 protrudes to the outside of the electronic pen 3. The rear end of the core body 31 is connected to the ink storage portion 36 in which ink is stored. The ink storage portion 36 supplies ink to the core body 31. When the user writes on the paper sheet 120 using the electronic pen 3, a line image is formed on the paper sheet 120 by the ink.

In a state in which the coil 32 is wound around the periphery of the ink storage portion 36, the coil 32 is held between the core body 31 and the variable capacity condenser 33. The variable capacity condenser 33 is fixed to the inside of the electronic pen 3 by the board 34. The condenser 35 is mounted on the board 34. The condenser 35 and the variable capacity condenser 33 are connected in parallel to the coil 32 and form a known resonance (tuning) circuit.

The paper medium 100 is a booklet-like medium that can be opened out to a two-page spread in the left-right direction. In the paper medium 100, a pair of cover sheets (a front cover sheet 110L and a back cover sheet 110R) and a plurality of paper sheets 120 are respectively bound by a part of their edges. As an example, the paper medium 100 is an A5-sized notebook. The paper medium 100 is placed on the reading device 2 such that the front cover sheet 110L is placed on the upper surface of the sensor board 7L and the back cover sheet 11 OR is placed on the upper surface of the sensor board 7R. The user can use the electronic pen 3 to write a line image onto the paper sheet 120 of the paper medium 100. Position information of the electronic pen 3 that writes the line image onto the paper sheet 120 is detected by one of the sensor boards 7L and 7R that face the paper sheet 120 on which the line image has been written.

Figure 2:
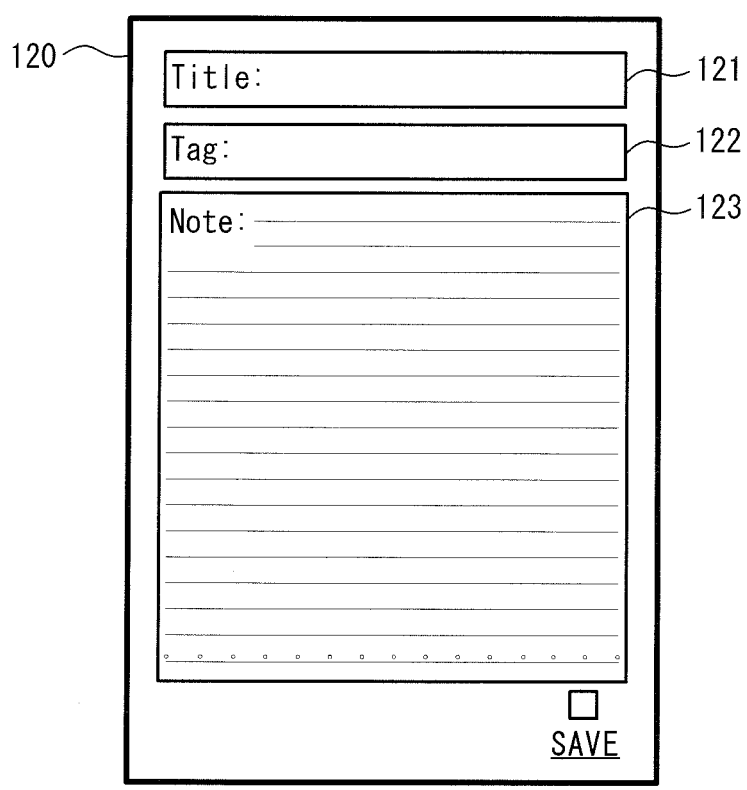
FIG. 2 is a diagram showing a paper sheet.

An example of the paper sheet 120 will be explained with reference to FIG. 2. Note that FIG. 2 shows one page of the paper sheet 120. In a case where the paper medium 100 is placed on the sensor boards 7L and 7R of the reading device 2 in a two-page spread state, two of the paper sheets 120 are arranged side by side in the horizontal direction. As shown in FIG. 2, a plurality of areas are provided on the paper sheet 120 in advance. Specifically, a title area 121, a tag area 122 and a note area 123 are provided in a line in the vertical direction on the paper sheet 120. The note area 123 is an area in which the user can use the electronic pen 3 to freely write a line image. The title area 121 is an area in which the user can use the electronic pen 3 to write a title relating to the line image that has been written in the note area 123. The tag area 122 is an area in which the electronic pen 3 can be used to write a keyword, as a tag, in order to search for the line image that has been written in the note area 123.

Note that, a type, a number and a size of each of the areas provided on the paper sheet 120 can be changed. Paper sheets (a paper sheet 130 (refer to FIG. 9) and a paper sheet 140 (refer to FIG. 10)) having a different type, number and size of each of the areas will be explained in more detail later.

Figure 3:
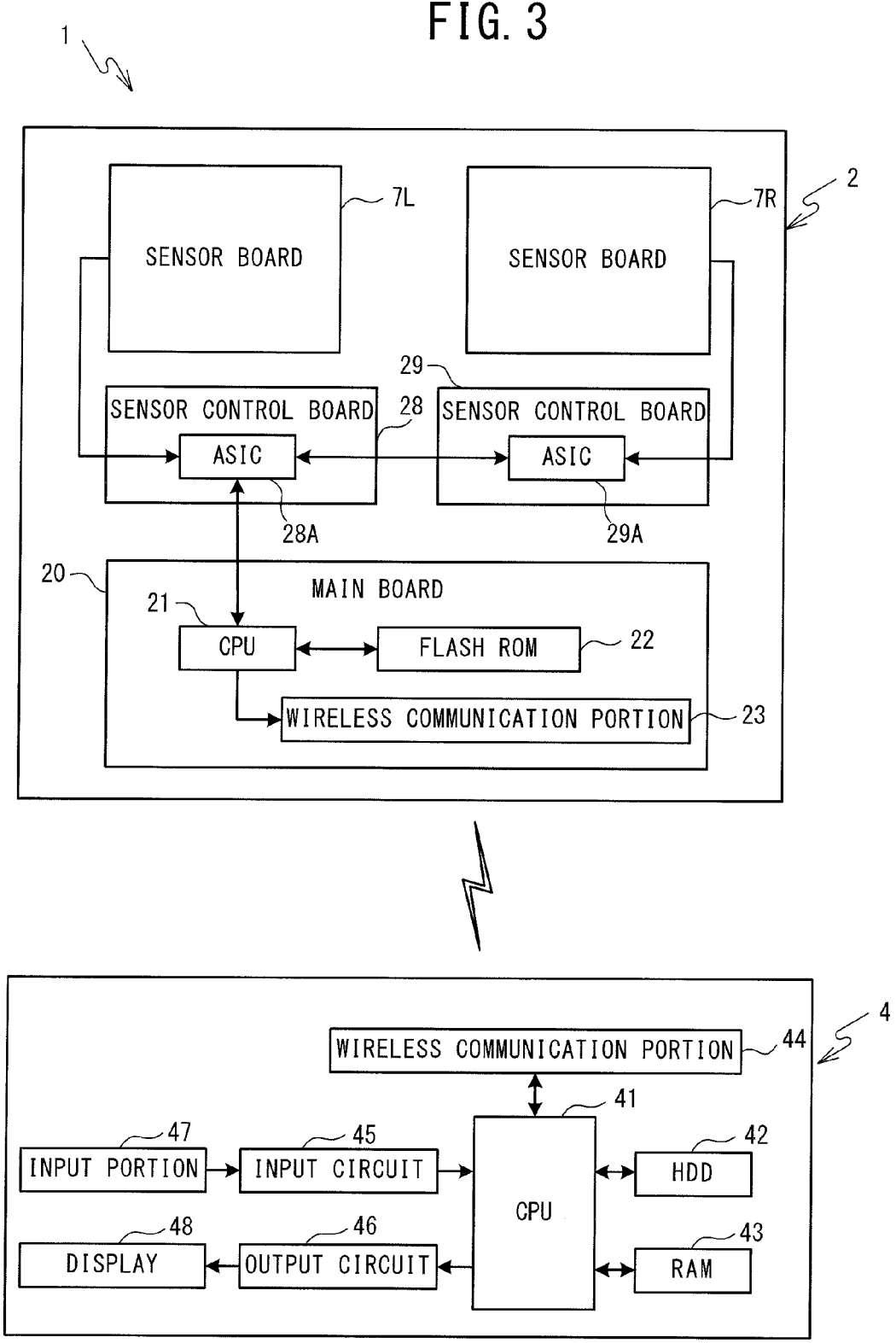
FIG. 3 is block diagram showing an electrical configuration of a reading device and a PC.

An electrical configuration of the handwriting input system 1 will be explained with reference to FIG. 3. First, an electrical configuration of the reading device 2 will be explained. The reading device 2 includes the sensor boards 7L and 7R, a main board 20 and sensor control boards 28 and 29.

The main board 20 includes a CPU 21, a flash ROM 22 and a wireless communication portion 23. The flash ROM 22 and the wireless communication portion 23 are electrically connected to the CPU 21. The CPU 21 is configured to control the reading device 2. Various programs that are executed in order for the CPU 21 to control the reading device 2 are stored in the flash ROM 22. Further, data that represents the trajectory of the electronic pen 3 that writes the line image on the paper sheet 120 (written by the electronic pen 3 on the sensor boards 7L and 7R) is stored in the flash ROM 22. Hereinafter, the data that represents the trajectory of the electronic pen 3 is referred to as the stroke data. The stroke data identifies the trajectory of the electronic pen 3 that writes the line image on the paper sheet 120 of the paper medium 100, using a plurality of pieces of position information of the electronic pen 3 detected over time by the sensor boards 7L and 7R. The stroke data includes coordinate information that represents each of a plurality of positions on the trajectory. The wireless communication portion 23 is a controller for executing near-field wireless communication with an external electronic device.

The sensor board 7L is electrically connected to an application-specific integrated circuit (ASIC) 28A of the sensor control board 28. The ASIC 28A performs processing for generating the stroke data based on a writing operation when the writing operation by the electronic pen 3 is performed on the sensor board 7L. This will be explained in more detail later. The sensor board 7R is electrically connected to an ASIC 29A of the sensor control board 29. Although details will be described later, the ASIC 29A performs processing for generating the stroke data based on a writing operation when the writing operation by the electronic pen 3 is performed on the sensor board 7R. Of the ASIC 28A and the ASIC 29A, the ASIC 28A on the master side is directly connected to the CPU 21 and the ASIC 29A on the slave side is connected to the CPU 21 via the ASIC 28A.

The principle by which the stroke data is acquired when the writing operation is performed by the electronic pen 3 on the sensor boards 7L and 7R will be briefly explained. The CPU 21 controls the ASIC 28A and the ASIC 29A and causes a current (a sending current for excitation) of a specific frequency to flow to each one of the loop coils of the sensor boards 7L and 7R. In this way, a magnetic field is generated from each of the loop coils of the sensor boards 7L and 7R. For example, when the user uses the electronic pen 3 to write the line image on the paper sheet 120 of the paper medium 100 that is fixed to the reading device 2 in a state in which the magnetic field is generated, the electronic pen 3 comes very close to the sensor boards 7L and 7R. Thus, a resonance circuit of the electronic pen 3 resonates as a result of electromagnetic induction and an induction field is generated.

Next, the CPU 21 controls the ASIC 28A and the ASIC 29A and stops the generation of the magnetic field from the loop coils of each of the sensor boards 7L and 7R. Then, the induction field generated from the resonance circuit of the electronic pen 3 is received by the loop coils of each of the sensor boards 7L and 7R. The CPU 21 controls the ASIC 28A and the ASIC 29A and causes a signal current (a reception current) that is flowing through each of the loop coils of the sensor boards 7L and 7R to be detected. The ASIC 28A and the ASIC 29A perform this operation one by one for all of the loop coils, and the position of the electronic pen 3 is detected as coordinate information based on the reception current.

In a state in which the electronic pen 3 is being used to write the line image on the paper sheet 120, a writing pressure is applied to the core body 31. The inductance of the coil 32 varies depending on the writing pressure applied to the core body 31. Accordingly, the resonance frequency of the resonance circuit of the electronic pen 3 changes. The CPU 21 detects the change in the resonance frequency (a phase change) and identifies the writing pressure applied to the electronic pen 3. More specifically, the CPU 21 can determine, based on the identified writing pressure from the electronic pen 3, whether the line image is being written on the paper sheet 120 of the paper medium 100. In a case where it is determined that the line image is being written on the paper sheet 120, the CPU 21 acquires the stroke data that includes the coordinate information representing the position of the electronic pen 3, and stores the acquired stroke data in the flash ROM 22.

Note that the reading device 2 may detect the position of the electronic pen 3 using another method. For example, the reading device 2 may include a touch panel. It is preferable that the driving method of the touch panel is a resistance film method. The paper medium 100 may be placed on top of the touch panel. The CPU 21 may detect the position at which the writing pressure is applied via the touch panel when the writing operation is performed by which the electronic pen 3 writes the line image on the paper sheet 120 of the paper medium 100.

The electrical configuration of the PC 4 will be explained. The PC 4 includes a CPU 41 that controls the PC 4. The CPU 41 is electrically connected to a hard disk drive (HDD) 42, a RAM 43, a wireless communication portion 44, an input circuit 45 and an output circuit 46. Various programs that are executed by the CPU 41 are stored in the HDD 42. In addition, a table 421 (refer to FIG. 4, to be explained later) is stored in the HDD 42.

The PC 4 includes a medium reading device (a CD-ROM drive, for example) that is not shown in the drawings. The PC 4 is configured to read a program that is stored in a storage medium (a CD-ROM, for example) from the medium reading device and to install the program in the HDD 42. Note that, the program may be received from an external device (not shown in the drawings) that is connected to the PC 4 or from a network, and may be installed in the HDD 42.

A variety of temporary data are stored in the RAM 43. The wireless communication portion 44 is a controller that performs near-field wireless communication with an external electronic device. The input circuit 45 performs control to transmit an instruction to the CPU 41 from an input portion 47 (such as a mouse, a keyboard, a touch panel or the like). The output circuit 46 performs control to display an image on a display 48 in accordance with an instruction from the CPU 41.

In the present embodiment, the CPU 21 of the reading device 2 acquires the stroke data representing the trajectory of the line image written on the paper sheet 120 of the paper medium 100 by the electronic pen 3, and stores the acquired stroke data in the flash ROM 22. The near-field wireless communication is performed between the wireless communication portion 23 of the reading device 2 and the wireless communication portion 44 of the PC 4. The stroke data stored in the flash ROM 22 is transferred from the reading device 2 to the PC 4. The CPU 41 of the PC 4 stores the stroke data transferred from the reading device 2 in the RAM 43. Note that the communication when the stroke data is transferred from the reading device 2 to the PC 4 is not limited to the wireless communication and may be performed by wired communication.

Of the trajectories represented by the stroke data stored in the RAM 43, the CPU 41 extracts and digitizes the trajectory of the line image written on the note area 123 (refer to FIG. 2) of the paper sheet 120, and generates an image file. The image file is a data file in which the trajectory of the line image is represented by a digital image. The digital image is, for example, a vector image or a raster image. The image file is, for example, a JPEG file, a GIF file, a PNG file or a BMP file.

Of the trajectories represented by the stroke data stored in the RAM 43, the CPU 41 identifies, by optical character recognition (OCR) processing, a character string that forms the trajectory of the line image written in the title area 121 (refer to FIG. 2) of the paper sheet 120. Note that the character string includes characters, numerals, symbols and graphics etc. that are represented by character code that can be recognized by the PC 4. There are not only cases in which a plurality of characters, numerals, symbols and graphics etc. are identified, but also cases in which one character, one numeral, one symbol or one graphic etc. is identified. The CPU 41 provisionally generates image data representing the trajectory that is represented by the stroke data, and identifies the character string by performing the OCR processing on the provisionally generated image data. Note that the method for identifying the character string from the trajectory represented by the stroke data can be changed. For example, the CPU 41 may use known pattern matching technology to directly identify the character string from the stroke data.

The CPU 41 sets the identified character string as the file name for the generated image file and stores the set file name in a folder that has been designated in advance by the user. Note that the folder in which the image file is stored may be designated by the user writing on the paper sheet 140 (refer to FIG. 10) of the paper medium 100. The method by which the user designates the folder by writing on the paper sheet 140 of the paper medium 100 will be explained in more detail later.

Of the trajectories represented by the stroke data stored in the RAM 43, the CPU 41 identifies, by the OCR processing, a character string that is formed by the trajectory of the line image written in the tag area 122 (refer to FIG. 2) of the paper sheet 120. The CPU 41 associates the identified character string, as a tag, with the image file. It is possible to associate two or more tags with one image file. The tag that is associated with the image file can be used as a keyword when searching for the image file. Note that the tag need not necessarily only be a keyword when searching for the image file, but may be used as a database attribute, for example. Further, the method of identifying the tag that is associated with the image file can be changed. For example, a table of association (not shown in the drawings) in which a plurality of candidate tags are associated with numerals may be stored in advance in the HDD 42. The CPU 41 may identify a numeral based on the trajectory of the line image written in the tag area 122, and may identify the tag associated with the identified numeral by referring to the table of association. The CPU 41 may associate the identified tag with the image file.

The CPU 41 associates the image file and the tag by storing the file name of the image file, the location of the folder storing the image file and the tag in association with each other in the table 421. FIG. 4 shows the table 421 stored in the HDD 42. The file name of the image file, the location of the folder storing the image file and the tag are stored in association with each other in the table 421.

Figure 5:
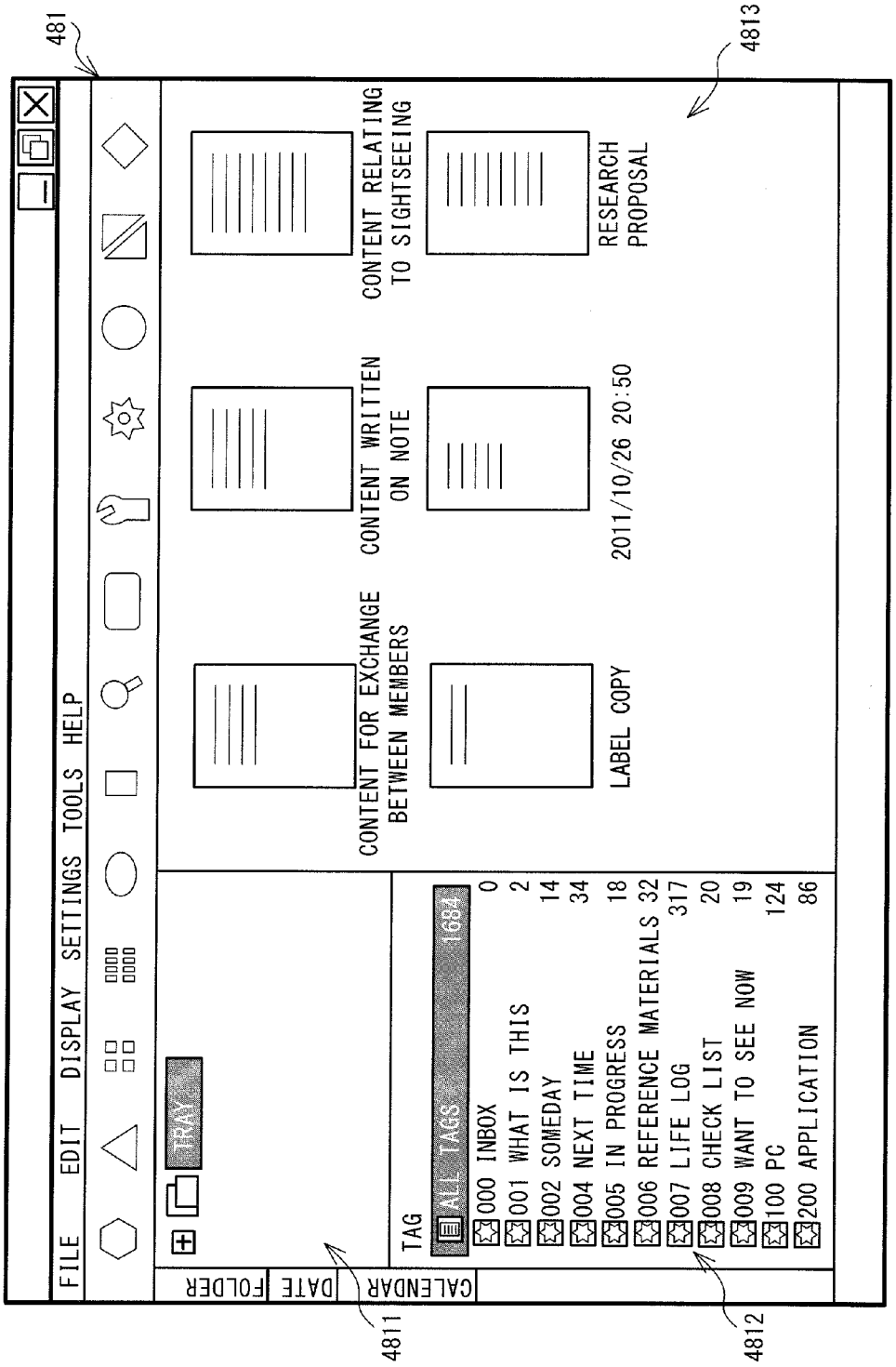
FIG. 5 is a diagram showing a display screen.

FIG. 5 shows a display screen 481 that is displayed on the display 48 based on the table 421 (refer to FIG. 4). The display screen 481 includes a folder display area 4811, a tag display area 4812 and a thumbnail display area 4813. The folder display area 4811 indicates a correlative relationship (a hierarchical structure) between a plurality of folders storing the image file. The plurality of folders stored as locations in the table 421 are hierarchically displayed in the folder display area 4811. The user can select, via the input portion 47, one of the plurality of folders displayed in the folder display area 4811.

All the tags that are associated with the image files stored in the folder selected by the user (from among the folders displayed in the folder display area 4811) are displayed in the tag display area 4812, in association with the number of image files that are associated with the tags. The tags stored in the table 421 are displayed in the tag display area 4812.

All of the image files stored in the folder selected by the user from among the folders displayed in the folder display area 4811 are displayed in the thumbnail display area 4813 as thumbnails, along with the respective file name.

Figure 7:
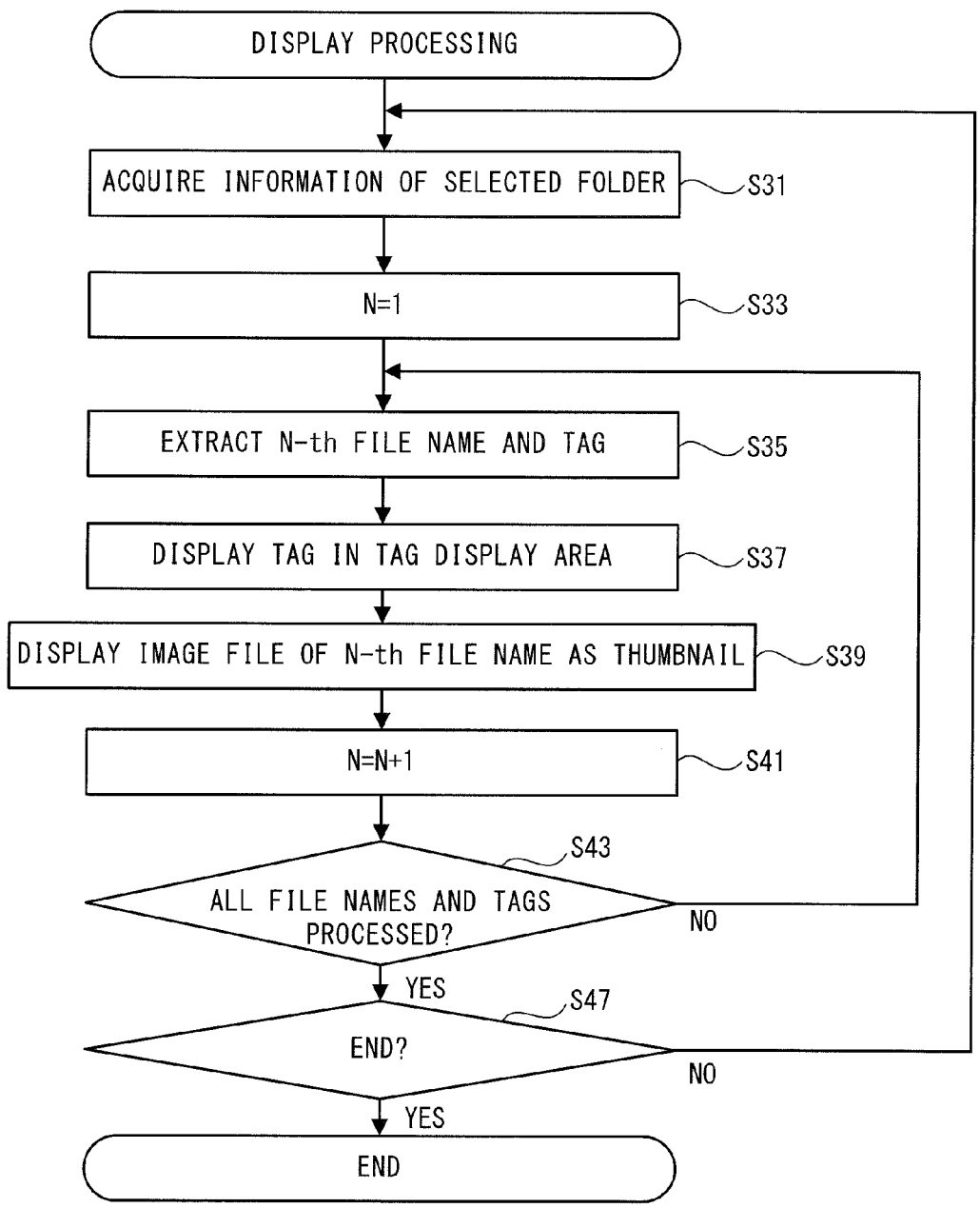
FIG. 7 is a flowchart of display processing.
Figure 8:
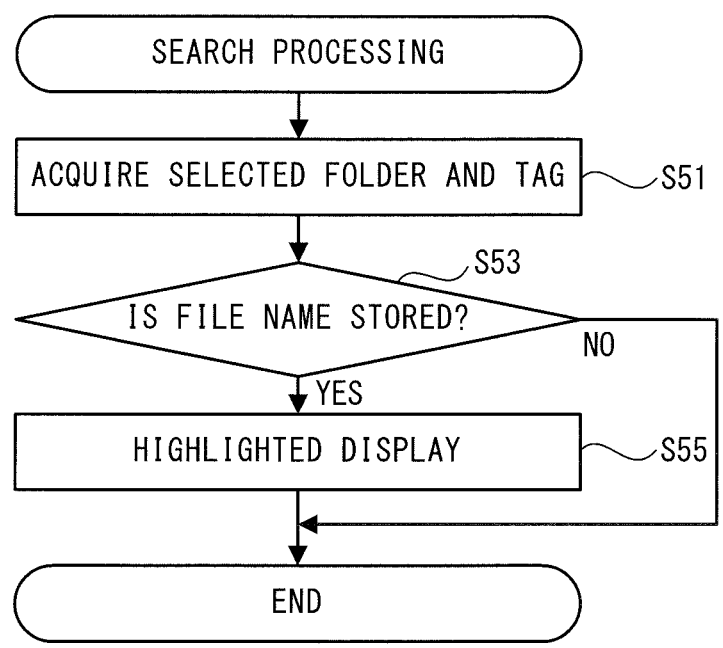
FIG. 8 is a flowchart of search processing.

Various processing performed by the CPU 41 (import processing, display processing, search processing) will be explained with reference to FIG. 6 to FIG. 8. The CPU 41 performs the various processing by operating based on the programs stored in the HDD 42.

The data import processing will be explained with reference to FIG. 6. The data import processing is started by the CPU 41 when an instruction to import the stroke data from the reading device 2 is received via the input portion 47 of the PC 4. The CPU 41 may start the data import processing when wireless communication with the reading device 2 becomes possible. The CPU 41 controls the wireless communication portion 44 and performs communication with the wireless communication portion 23 of the reading device 2, and thus acquires the stroke data stored in the flash ROM 22 of the reading device 2 (step S11). The CPU 41 stores the acquired stroke data in the RAM 43.

Of the stroke data stored in the RAM 43, the CPU 41 extracts the stroke data representing the trajectory written in the title area 121 (refer to FIG. 2) of the paper sheet 120 (step S13). Based on the trajectory represented by the extracted stroke data, the CPU 41 identifies the character string by the OCR processing (step S15). The CPU 41 stores the identified character string in the RAM 43. Of the stroke data stored in the RAM 43, the CPU 41 extracts the stroke data representing the trajectory of the line image written in the tag area 122 (refer to FIG. 2) of the paper sheet 120 (step S17). Based on the trajectory represented by the extracted stroke data, the CPU 41 identifies the character string by the OCR processing (step S19). The CPU 41 stores the identified character string in the RAM 43. Of the stroke data stored in the RAM 43, the CPU 41 extracts the stroke data representing the trajectory of the line image written in the note area 123 (refer to FIG. 2) of the paper sheet 120 (step S21). Based on the line image of the trajectory represented by the extracted stroke data, the CPU 41 generates the image file (step S23).

Specific examples of the processing for extracting the stroke data performed at step S13, step S17 and step S21 are as follows. The CPU 41 stores coordinate information indicating positions on the sensor boards 7L and 7R corresponding to the title area 121, the tag area 122 and the note area 123 of the paper sheet 120 in the HDD 42 in advance. Of the coordinate information included in the stroke data acquired at step S11 and stored in the RAM 43, the CPU 41 extracts the coordinate information included in each of areas respectively corresponding to the title area 121, the tag area 122 and the note area 123. The extracted coordinate information respectively indicate positions on the trajectory of the line image written in the title area 121, the tag area 122 and the note area 123 of the paper sheet 120. In this manner, the CPU 41 can extract the stroke data representing the trajectory of the line image having the same form as the line image written in the title area 121, the tag area 122 and the note area 123 of the paper sheet 120.

The CPU 41 sets the character string identified at step S15 as the file name of the image file generated at step S23. The character string identified at step S15 is, namely, the character string identified based on the stroke data representing the trajectory within the title area 121. The CPU 41 stores the image file for which the file name has been set in the designated folder (step S25). The CPU 41 stores the character string identified at step S15 in the table 421 as the file name. The CPU 41 associates the character string identified at step S19 with the file name, as a tag, and stores the associated tag in the table 421 (refer to FIG. 4). The character string identified at step S19 is, namely, the character string identified based on the stroke data representing the trajectory within the tag area 122. The CPU 41 stores the location of the folder, in which the image file generated at step S23 is stored, in the table 421, in association with the file name and the tag (step S27). In this manner, the image file, the file name and the tag are associated with each other. The data import processing ends.

The display processing will be explained with reference to FIG. 7. The display processing is started by the CPU 41 when an instruction is input via the input portion 47 of the PC 4 to display the display screen 481 on the display 48. In the display processing, the CPU 41 uses a variable N that is stored in the RAM 43.

The CPU 41 displays the display screen 481 on the display 48. The CPU 41 hierarchically displays the folders, which are stored as locations in the table 421 (refer to FIG. 4), in the folder display area 4811. The CPU 41 refers to the table 421 (refer to FIG. 4). The user can select one of the folders displayed in the folder display area 4811. The CPU 41 acquires, from the table 421, the file names and the tags that are associated with the location corresponding to the folder selected by the user (step S31). The CPU 41 performs initialization by setting 1 as the variable N (step S33). Of the file names and the tags acquired at step S31, the CPU 41 extracts the N-th file name and tag (step S35). The CPU 41 displays the extracted tag in the tag display area 4812 of the display screen 481 and displays 1 as the variable (step S37). In a case where the same tag is already displayed in the tag display area 4812, the CPU 41 adds 1 to the number corresponding to the displayed same tag and updates the variable N. The CPU 41 acquires the image file corresponding to the N-th file name. The CPU 41 associates the file name with the acquired image file and displays a thumbnail in the thumbnail display area 4813 (step S39). The CPU 41 adds 1 to the variable N (step S41).

The CPU 41 determines whether the processing from step S35 to step S41 has been performed with respect to all of the file names and tags acquired at step S31 (step S43). In a case where the processing from step S35 to step S41 has not been performed with respect to all of the file names and tags acquired at step S31 and unprocessed file names and tags are remaining (no at step S43), the CPU 41 returns the processing to step S35. The CPU 41 repeats the processing from step S35 to step S41 based on the updated variable N. In a case where the processing from step S35 to step S41 has been performed with respect to all of the file names and tags acquired at step S31 (yes at step S43), the CPU 41 determines whether an instruction for ending the display of the display screen 481 has been input via the input portion 47 of the PC 4 (step S47). In a case where the instruction for ending the display of the display screen 481 has not been input (no at step S47), the CPU 41 returns the processing to step S31. When the instruction for ending the display of the display screen 481 has been input (yes at step S47), the CPU 41 ends the display of the display screen 481. The display processing ends.

The search processing will be explained with reference to FIG. 8. The search processing is started by the CPU 41 when an operation is input via the input portion 47 of the PC 4 to select one of the folders displayed in the folder display area 4811 and one of the tags displayed in the tag display area 4812 in a state in which the display screen 481 is displayed on the display 48.

The CPU 41 acquires the selected folder and tag (step S51). The CPU 41 refers to the table 421 (refer to FIG. 4). The CPU 41 determines whether a file name is associated with the location of the acquired folder and with the tag (step S53). In a case where the appropriate file name is stored in the table 421 (yes at step S53), of the plurality of image files displayed as thumbnails in the thumbnail display area 4813 of the display screen 481, the CPU 41 fills in a predetermined color (such as yellow) around the image file of the appropriate file name and also highlights the file name through inverse display of the file name (step S55). The search processing ends. In a case where the appropriate file name is not stored in the table 421 (no at step S53), the CPU 41 ends the search processing.

Note that, at the above-described step S51, the processing to acquire the selected folder and tag can be changed. For example, in a state in which either one or the other of the folder or the tag is selected, the CPU 41 may acquire the selected folder or tag at step S51. The CPU 41 may refer to the table 421 and perform highlighted display of the image file of the file name corresponding to the acquired folder or tag. Further, for example, an input portion on which direct text input of the folder and tag is possible may be provided on the display screen 481. The CPU 41 may acquire, at step S51, the folder and tag input on the input portion. In addition, using a method other than the method for the highlighted display at step S55, the image file may be notified to the user. For example, the CPU 41 may notify the user of the image file by displaying the image file as a full-screen display.

As described above, the CPU 41 of the PC 4 identifies the character string based on the trajectory of the electronic pen 3 when the user uses the electronic pen 3 to write the line image in the title area 121 (refer to FIG. 4) and the tag area 122 (refer to FIG. 4) of the paper sheet 120. The CPU 41 generates the image file of the line image written in the note area 123 of the paper sheet 120. The CPU 41 sets the character string written in the title area 121 as the file name of the generated image file. Thus, the user can easily set the file name of the image file written in the note area 123 of the paper sheet 120 in association with the line image written in the note area 123. The user does not need to perform an operation to set the file name of the image file and thus ease of operation is improved.

Further, the CPU 41 associates the character string written in the tag area 122 with the file name and the location of the generated image file, as a tag, and stores the associated tag in the table 421. In this manner, the CPU 41 associates the tag with the file name and the location. The associated tag can be used as a keyword when searching for the image file. Thus, the user can easily search for a desired image file by writing the keyword to search for the image file in the tag area 122 as the tag. In addition, the user does not need to perform an operation to set the keyword to search for the image file.

Furthermore, the CPU 41 can write the line image in the title area 121, the tag area 122 and the note area 123 using the same input method. The same input method is, namely, the handwriting input using the electronic pen 3. As a result, the image file, the file name and the tag can be efficiently input and the ease of operation for the user can be further improved.

The character string written in the tag area 122 by the electronic pen 3 is displayed, as the tag, in the tag display area 4812 of the display screen 481. As the tag is associated with the image file, the user can easily recognize, at a glance, which of the tags is associated with which of the image files. As a result, the user can select and use the tag to be used as the keyword for a search, from among the tags displayed in the tag display area 4812.

The image files and the file names are displayed as thumbnails in the thumbnail display area 4813 of the display screen 481. Thus, the user can recognize at the same time the plurality of image files including the line image written in the note area 123 by the electronic pen 3. In the thumbnail display area 4813, the image files and the file names are associated with each other. Thus, the user can easily recognize the correlative relationship between the character string written in the title area 121 by the electronic pen 3 and the image file. The user can thus rapidly find the desired image file.

The CPU 41 manages the information relating to the image files, the file names and the tags by associating (the location of) the image files, the file names and the tags with each other and storing the associated image files, the file names and the tags in the table 421. As a result, the CPU 41 can easily search for the image file and the file name corresponding to the tag designated by the user.

By performing highlighted display of the image file corresponding to the character string written in the tag area 122 by the electronic pen 3, the CPU 41 can notify the image file to the user. As a result, the user can clearly recognize the desired image file.

The above-described embodiment is one example, and various modifications can be made to the present disclosure. In the above-described embodiment, the CPU 41 identifies the character string written in the title area 121 of the paper sheet 120, and sets the identified character string as the file name of the image file. However, the CPU 41 may set another character string, part of which includes the character string written in the title area 121, as the file name of the image file.

In the above-described embodiment, the CPU 41 associates the tag with the image file by associating and storing, in the table 421, the file name, the location in which the image file is stored and the tag. However, the CPU 41 may associate the image file and the tag with each other by directly storing the tag as header information of the image file.

A part or all of the data import processing (refer to FIG. 6) of the above-described embodiment may be performed by the CPU 21 of the reading device 2. The PC 4 may acquire the image files and the table 421 generated by the CPU 21 of the reading device 2.

Figure 9:
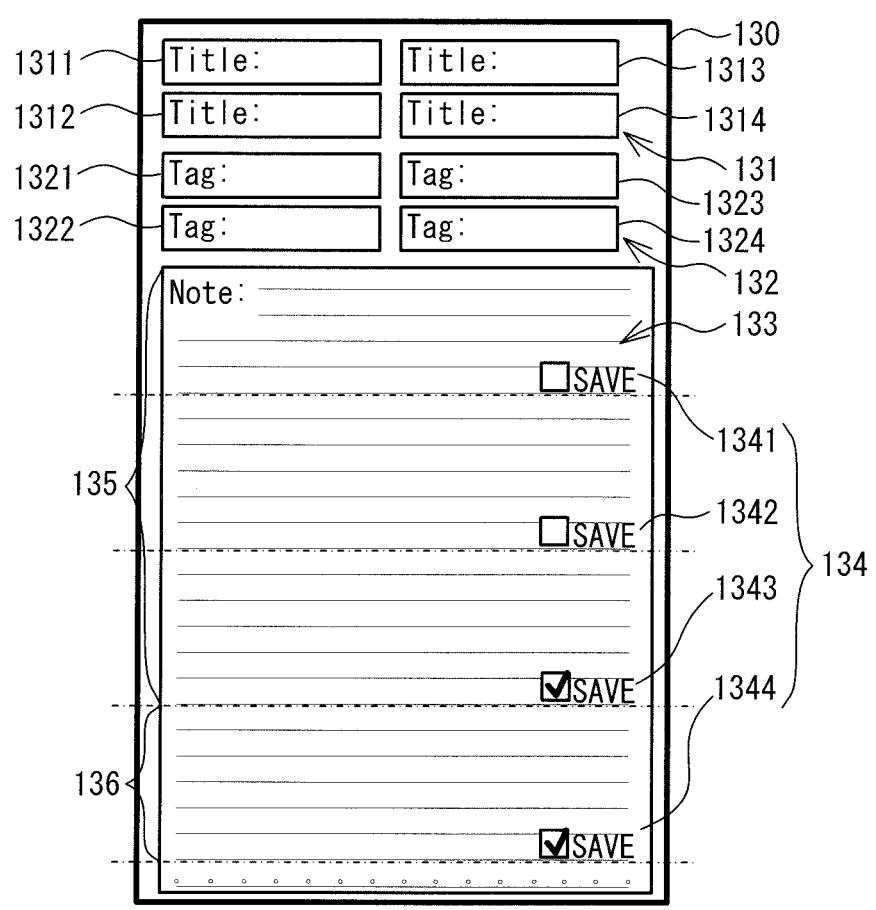
FIG. 9 is a diagram showing a paper sheet.

In the above-described embodiment, the size of the note area 123 provided on the paper sheet 120 is unchangeable. In contrast, a configuration may be adopted in which the user can change the size of the note area 123. FIG. 9 shows the paper sheet 130 according to a modified example. The paper sheet 130 includes four title areas 131 (title areas 1311 to 1314), four tag areas 132 (tag areas 1321 to 1324) and a note area 133. Four partition check boxes 134 (1341 to 1344) are provided in the note area 133. The partition check boxes 1341 to 1344 are aligned at equal intervals in the up-down direction within the note area 133. The note area 133 is divided into four equal areas by line segments that extend in the left-right direction through each of the partition check boxes 1341 to 1344. The four areas are associated, respectively, with the title area 1311 and the tag area 1321, the title area 1312 and the tag area 1322, the title area 1313 and the tag area 1323, and the title area 1314 and the tag areas 1324, in this order from the upper area.

The user can divide and use the note area 133. For example, when the user write a check mark in the partition check boxes 1343 and 1344 using the electronic pen 3, the CPU 41 extracts the stroke data which is the stroke data representing the trajectory of the line image representing the check mark and which includes coordinate information representing positions on the sensor boards 7L and 7R corresponding to the check boxes 1343 and 1344. The CPU 41 may extract the stroke data of the check marks, from the stroke data inside the note area 133, by pattern matching. Further, the CPU 41 may store the position information indicating positions on the sensor boards 7L and 7R corresponding to the area of the partition check box 134, in the HDD 24 in advance. The CPU 41 may extract the stroke data of the check marks written in the check boxes 1343 and 1344 by extracting the stroke data within the area of the partition check box 134.

The CPU 41 divides the note area 133 into an area 135 and an area 136. The area 135 is an area from the top edge of the note area 133 to the line segment that extends in the left-right direction through the partition check box 1343. The area 136 is an area from the line segment that extends in the left-right direction through the partition check box 1343 to the lower edge of the note area 133. The CPU 41 extracts the stroke data representing the trajectory of the line image written in each of the divided areas 135 and 136 (step S21, refer to FIG. 6), and generates image files, separately (step S23, refer to FIG. 6).

Figure 6:
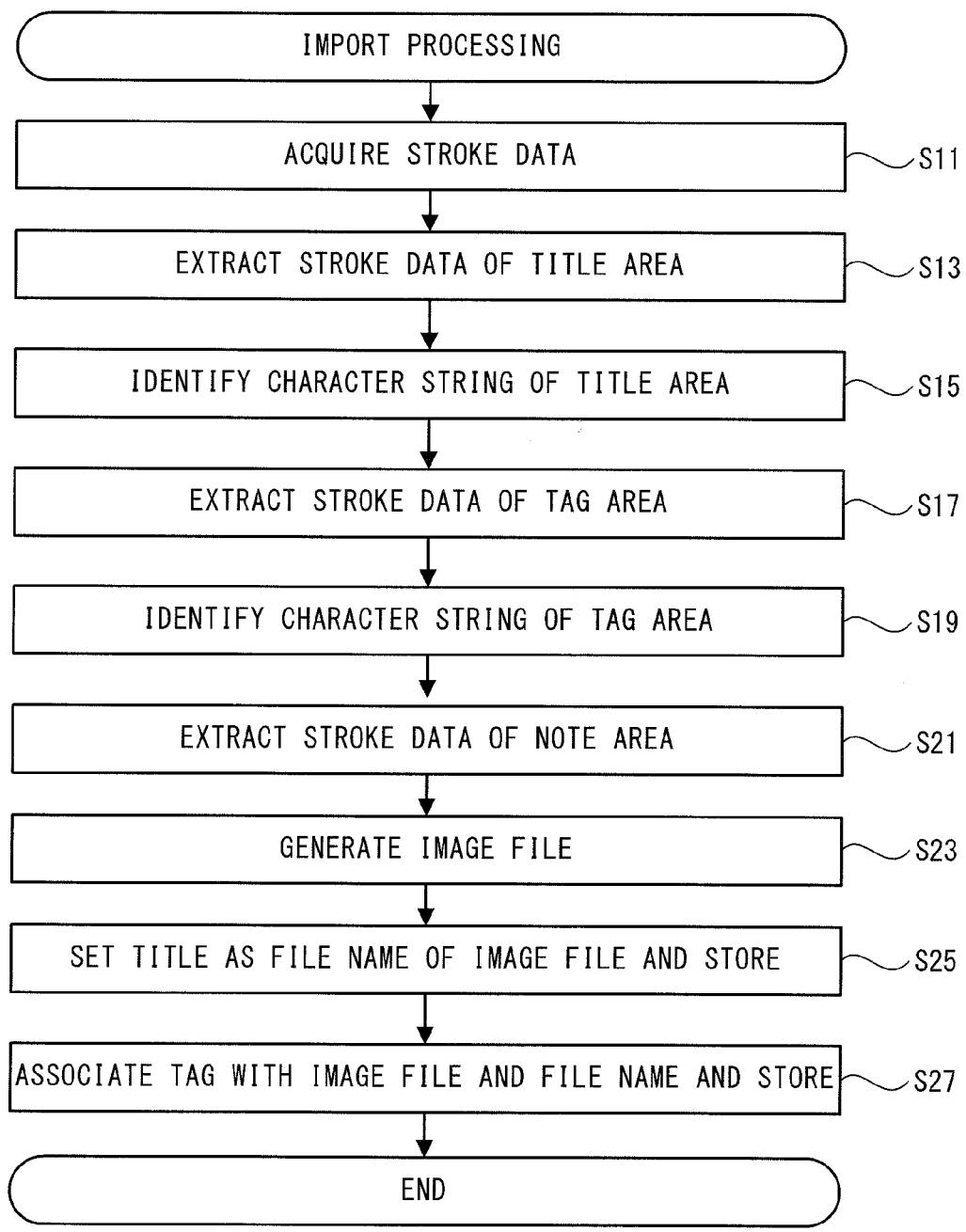
FIG. 6 is a flowchart of import processing.

The character string that is identified based on the trajectory of the line image written in the title area 1311 is set as the file name of the image file that is based on the trajectory of the line image written in the area 135, and the set file name is stored in a folder (step S25, refer to FIG. 6). In addition, the character string that is identified based on the trajectory of the line image written in the tag area 1321 is associated, as the tag, with the file name and the location of the image file and stored in the table 421 (step S27, refer to FIG. 6). Similarly, the character string that is identified based on the trajectory of the line image written in the title area 1314 is set as the file name of the image file that is based on the trajectory of the line image written in the area 136, and the set file name is stored in a folder (step S25, refer to FIG. 6). The character string that is identified based on the trajectory of the line image written in the tag area 1324 is associated, as the tag, with the file name and the location of the image file and stored in the table 421 (step S27, refer to FIG. 6).

Figure 10:
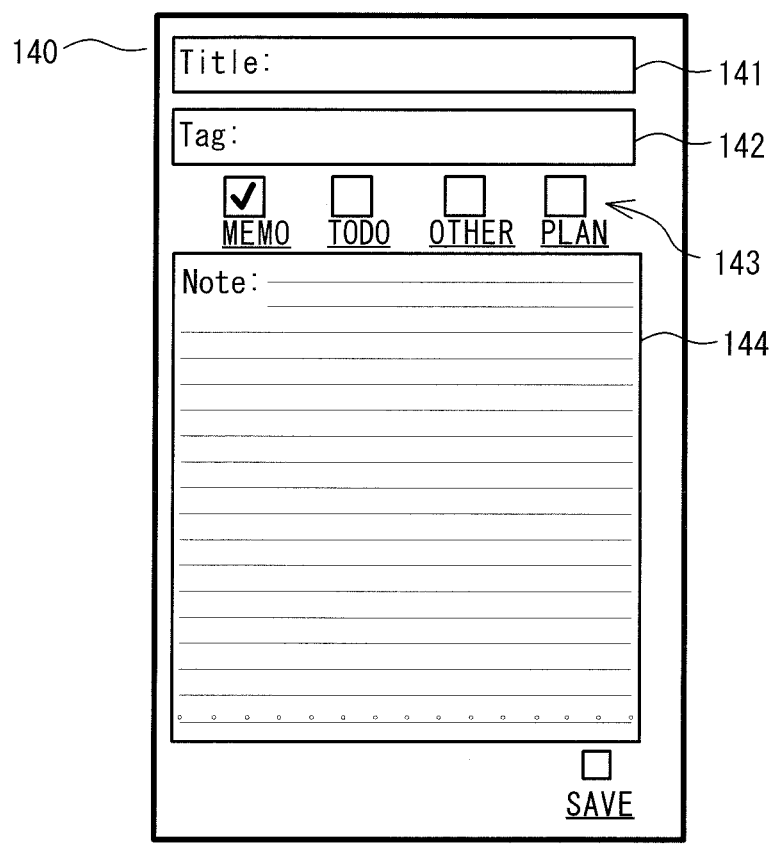
FIG. 10 is a diagram showing a paper sheet.

In the above-described embodiment, the folder in which the image file is stored may be identified by the user writing on the paper sheet. FIG. 10 shows the paper sheet 140 according to a modified example. The paper sheet 140 includes a title area 141, a tag area 142, folder specification check boxes 143 and a note area 144. The title area 141, the tag area 142 and the note area 144 are substantially the same as in the above-described embodiment and an explanation is therefore omitted here. The user can select one of "Memo," "To Do," "Other" and "Plan" that are included in the folder specification check boxes 143 by writing a check mark, and can thus specify the folder in which to store the image file.

The CPU 41 recognizes the item in which the check mark has been written. The CPU 41 may store position information indicating positions on the sensor boards 7L and 7R that correspond to an area of the folder specification check boxes 143, in the HDD 42 in advance. The CPU 41 may recognize the item in which the check mark has been written by extracting the stroke data within the area of the folder specification check boxes 143. The CPU 41 can store the image file that is based on the trajectory of the line image written in the note area 144, in the folder of the recognized item (step S25, refer to FIG. 6).

In the above-described embodiment, a configuration may be adopted in which the user writes a plurality of tags in the tag area 122, separating the tags with a comma ",". In a case where the character strings are recognized based on the stroke data of the tag area 122 and the character strings are separated by a comma, the CPU 41 may associate each of the separated character strings as separate tags with the file name and store them in the table 421.

Figure 11:
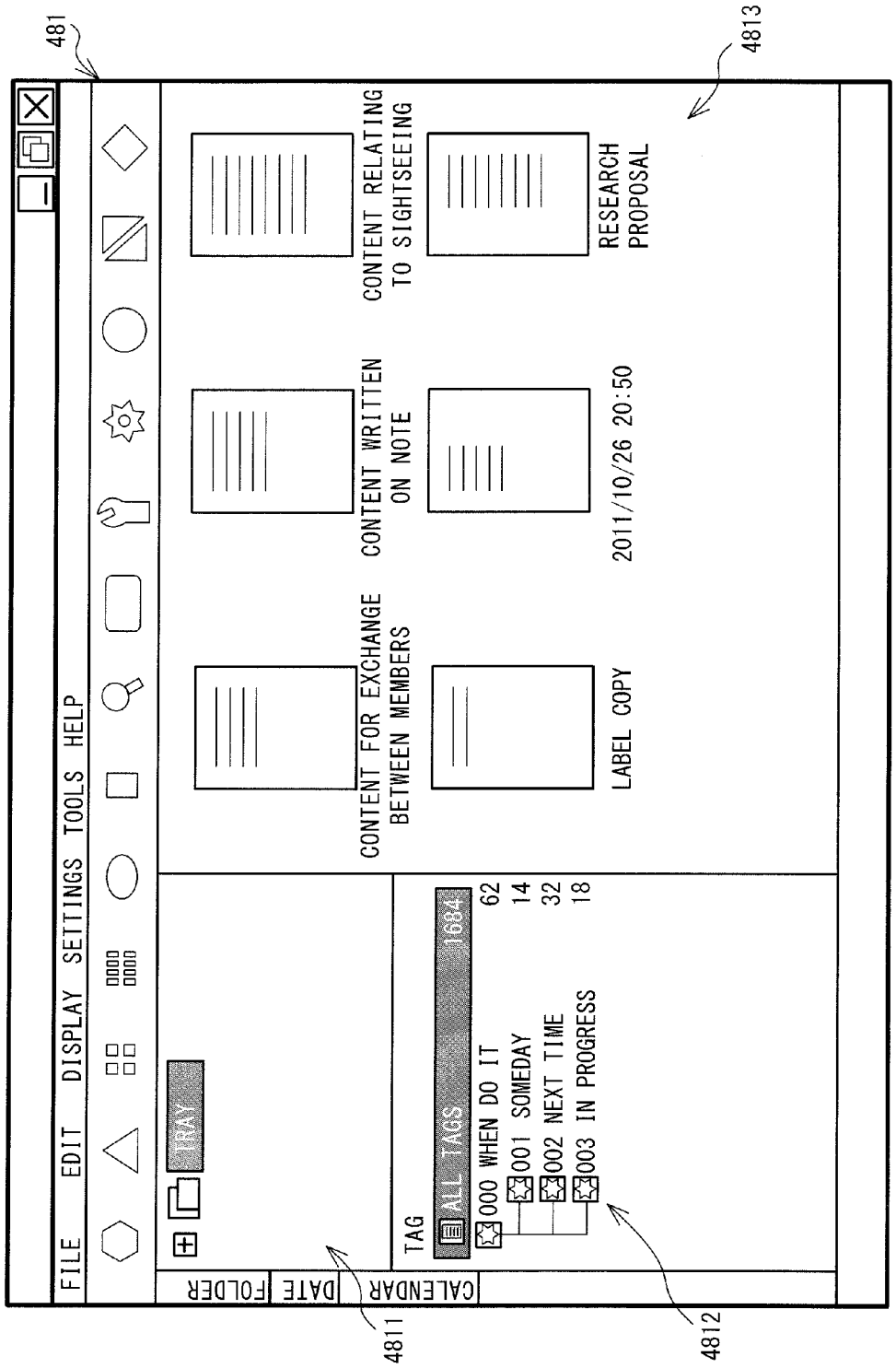
FIG. 11 is a diagram showing the display screen.

A configuration may be adopted in which the tag that is associated with the image file by writing in the tag area 122 is managed hierarchically. For example, in a case where the character strings are recognized based on the stroke data of the tag area 122 and the character strings are separated by a slash "/", the tags represented by the character strings before and after the slash may be managed hierarchically. More specifically, in a case where "when do it/someday, when do it/next time, when do it/in progress" is written in the tag area 122, each of the tags "someday," "next time" and "in progress" may be managed as tags that are subordinate to the "when do it" tag. Note that the tags "when do it/someday," "when do it/next time" and "when do it/in progress" may be associated with the file name and the location of the folder and stored in the table 421. In this case, the tags are displayed hierarchically in the tag display area 4812 of the display screen 481, as shown in FIG. 11.

In a case where the tags are hierarchically managed as described above, the search processing (refer to FIG. 8) may be performed in the following manner. When the tag "someday" that is displayed in the tag display area 4812 is selected by the user (refer to step S51 in FIG. 8), similarly to the above-described embodiment, the CPU 41 identifies the image file of the file name associated with the tag "someday" by referring to the table 421, and displays the image file as a thumbnail, along with the file name, in the thumbnail display area 4813 (refer to step S55 in FIG. 8). On the other hand, when the tag "when do it" is selected (refer to step S51 in FIG. 8), the CPU 41 identifies the image files of the file names associated with all of the tags that are subordinate to the "when do it" tag (namely, the tags "someday," "next time" and "in progress") by referring to the table 421 and displays the image files as thumbnails, along with the file names, in the thumbnail display area 4813 (refer to step S55 in FIG. 8).

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. An information management apparatus comprising:
   a processor; and
   a memory configured to store computer-readable instructions that, when executed, cause the processor to perform processes comprising:
      acquiring stroke data, the stroke data being data representing a trajectory detected by a detecting portion and being data that includes information indicating a plurality of positions on the trajectory, and the detecting portion being configured to detect the trajectory of a writing portion that moves within a predetermined area;
      identifying, based on first stroke data, a first character string formed by a first trajectory, the first stroke data being data representing the first trajectory among a plurality of trajectories represented by the stroke data, and the first trajectory being a trajectory within a first area that is a specific area within the predetermined area;
      identifying, based on second stroke data, a second character string formed by a second trajectory, the second stroke data being data representing the second trajectory among the plurality of trajectories represented by the stroke data, and the second trajectory being a trajectory within a second area that is a specific area within the predetermined area and that is an area other than the first area;
      generating an image file that is a data file representing, by an image, a third trajectory based on third stroke data, the third stroke data being data representing the third trajectory among the plurality of trajectories represented by the stroke data, and the third trajectory being a trajectory within a third area that is a specific area within the predetermined area and that is an area other than the first area and the second area;
      storing the image file in a storing portion as a file including at least the first character string in a file name; and
      storing the image file in the storing portion in association with data representing the second character string.

2. The information management apparatus according to claim 1, wherein
   the computer-readable instructions further cause the processor to perform processes comprising:
      associating the image file stored in the storing portion with a corresponding file name and displaying the associated image file as a thumbnail on display portion.

3. The information management apparatus according to claim 1, wherein
   the computer-readable instructions further cause the processor to perform processes comprising:
      displaying, on display portion, the second character string that is represented by data stored in the storing portion in association with the image file.

4. The information management apparatus according to claim 1, wherein
   the computer-readable instructions further cause the processor to perform processes comprising:
      acquiring a fourth character string; and
      performing notification of the image file that is stored in the storing portion in association with the data representing the second character string, which includes at least the fourth character string.

5. A non-transitory computer-readable medium storing computer-readable instructions that, when executed, cause an information management apparatus to perform processes comprising:
   acquiring stroke data, the stroke data being data representing a trajectory detected by a detecting portion and being data that includes information indicating a plurality of positions on the trajectory, and the detecting portion being configured to detect the trajectory of a writing portion that moves within a predetermined area;
   identifying, based on first stroke data, a first character string formed by a first trajectory, the first stroke data being data representing the first trajectory among a plurality of trajectories represented by the stroke data, and the first trajectory being a trajectory within a first area that is a specific area within the predetermined area;
   identifying, based on second stroke data, a second character string that is a character string formed by a second trajectory, the second stroke data being data representing the second trajectory among the plurality of trajectories represented by the stroke data, and the second trajectory being a trajectory within a second area that is a specific area within the predetermined area and that is an area other than the first area;
   generating an image file that is a data file representing, by an image, a third trajectory based on third stroke data, the third stroke data being data representing the third trajectory among the plurality of trajectories represented by the stroke data, and the third trajectory being a trajectory within a third area that is a specific area within the predetermined area and that is an area other than the first area and the second area;
   storing the image file in a storing portion as a file including at least the first character string in a file name; and
   storing the image file in the storing portion in association with data representing the second character string.

6. The non-transitory computer-readable medium according to claim 5, wherein the computer-readable instructions further cause the information management apparatus to perform a process comprising:
   associating the image file stored in the storing portion with a corresponding file name and displaying the associated image file as a thumbnail on display portion.

7. The non-transitory computer-readable medium according to claim 5, wherein the computer-readable instructions further cause the information management apparatus to perform a process comprising:
   displaying, on a display portion, the second character string that is represented by data stored in the storing portion in association with the image file.

8. The non-transitory computer-readable medium according to claim 5, wherein the computer-readable instructions further cause the information management apparatus to perform processes comprising:
   acquiring a fourth character string; and performing notification of the image file that is stored in the storing portion in association with the data representing the second character string, which includes at least the fourth character string.

* * * * *